US012020839B2

(12) United States Patent
Kunitsuka et al.

(10) Patent No.: US 12,020,839 B2
(45) Date of Patent: Jun. 25, 2024

(54) COMMON MODE FILTER

(71) Applicant: TDK Corporation, Tokyo (JP)

(72) Inventors: Kosuke Kunitsuka, Tokyo (JP); Keigo Higashida, Tokyo (JP); Emi Ito, Yamagata (JP)

(73) Assignee: TDK CORPORATION, Tokyo (JP)

( * ) Notice: Subject to any disclaimer, the term of this patent is extended or adjusted under 35 U.S.C. 154(b) by 440 days.

(21) Appl. No.: 17/342,119

(22) Filed: Jun. 8, 2021

(65) Prior Publication Data

US 2021/0391110 A1 Dec. 16, 2021

(30) Foreign Application Priority Data

Jun. 16, 2020 (JP) ................................ 2020-103915

(51) Int. Cl.
*H01F 17/04* (2006.01)
*H01F 17/00* (2006.01)
*H01F 27/28* (2006.01)
*H01F 27/29* (2006.01)
*H01F 27/30* (2006.01)

(52) U.S. Cl.
CPC ....... *H01F 17/045* (2013.01); *H01F 27/2828* (2013.01); *H01F 27/292* (2013.01); *H01F 27/306* (2013.01); *H01F 2017/0093* (2013.01)

(58) Field of Classification Search
CPC .. H01F 17/045; H01F 27/2828; H01F 27/292; H01F 27/306; H01F 2017/0093
See application file for complete search history.

(56) References Cited

U.S. PATENT DOCUMENTS

| | | | | |
|---|---|---|---|---|
| 10,559,415 | B2 * | 2/2020 | Chuang | H01F 27/24 |
| 10,600,554 | B2 * | 3/2020 | Hashimoto | H01F 27/2823 |
| 10,784,038 | B2 * | 9/2020 | Komaya | H01F 27/006 |
| 10,998,122 | B2 * | 5/2021 | Komaya | H01F 27/292 |
| 2007/0171020 | A1 * | 7/2007 | Morimoto | H01F 41/086 336/198 |
| 2014/0167903 | A1 * | 6/2014 | Tomonari | H01F 17/045 336/220 |
| 2015/0206646 | A1 * | 7/2015 | Dinh | H01F 17/045 336/188 |
| 2017/0025212 | A1 * | 1/2017 | Jerez | H01F 27/29 |
| 2017/0069418 | A1 * | 3/2017 | Yamakita | H01F 27/29 |

FOREIGN PATENT DOCUMENTS

JP 2019-121791 A 7/2019

* cited by examiner

*Primary Examiner* — Malcolm Barnes
(74) *Attorney, Agent, or Firm* — Rimon P.C.

(57) ABSTRACT

Disclosed herein is a common mode filter that includes first and second wires wound in the same direction around the winding core part. The first and second wires include first and second layer winding portions each including a plurality of blocks axially alternately arranged. A first block belonging to the first layer winding portion is disposed closest to the first flange part. A second block belonging to the second layer winding portion is disposed closest to the second flange part. The first and second wires cross each other in a region between axially adjacent blocks.

11 Claims, 7 Drawing Sheets

COMMON MODE FILTER

BACKGROUND OF THE INVENTION

Field of the Invention

The present invention relates to a common mode filter and, more particularly, to a common mode filter of a type in which a pair of wires cross each other along the way and a manufacturing method therefor.

Description of Related Art

A common mode filter is widely used in many electronic devices, such as mobile electronic devices and on-vehicle LANs, as an element for removing common mode noise superimposed on differential signal lines. In recent years, a common mode filter using a surface-mountable drum core supersedes a common mode filter using a toroidal core (see JP 2019-121791A). In the common mode filter described in JP 2019-121791A, a pair of wires are wound in odd-numbered blocks. Further, the pair of wires are reversed in vertical position between adjacent blocks and cross each other in a region between adjacent blocks.

In the winding method described in JP 2019-121791A, the vertical positions of the pair of wires in a block closest to one flange part and the vertical positions thereof in a block closest to the other flange part coincide with each other, so that it is possible to provide a common mode filter having no directivity and to improve the signal quality of bidirectional differential signals. However, the winding method described in JP 2019-121791A cannot necessarily achieve sufficient symmetry between the pair of wires, with the result that mode conversion characteristics indicating a rate at which a differential signal component is converted into a common mode noise component may deteriorate in high frequency regions.

SUMMARY

It is therefore an object of the present invention to further enhance the symmetry between the pair of wires in a common mode filter in which the pair of wires cross each other along the way.

A common mode filter according to the present invention includes: a core having a winding core part, a first flange part provided at one axial end of the winding core part, and a second flange part provided at the other axial end of the winding core part; first and second wires wound in the same direction around the winding core part; first and second terminal electrodes provided on the first flange part and connected respectively with one ends of the first and second wires; and third and fourth terminal electrodes provided on the second flange part and connected respectively with the other ends of the first and second wires. The first and second wires include a first layer winding portion including a plurality of blocks in each of which the first and second wires are wound by layer winding in an aligned state with one of the first and second wires positioned in the lower layer and the other one thereof positioned in the upper layer and a second layer winding portion including a plurality of blocks in each of which the first and second wires are wound by layer winding in an aligned state with the one of the first and second wires positioned in the upper layer and the other one thereof positioned in the lower layer. The plurality of blocks constituting the first layer winding portion and the plurality of blocks consisting the second layer winding portion are axially alternately arranged. Of the plurality of blocks constituting the first and second layer winding portions, a first block belonging to the first layer winding portion is disposed closest to the first flange part, and a second block belonging to the second layer winding portion is disposed closest to the second flange part. The first and second wires cross each other in a region between axially adjacent blocks.

According to the present invention, the pair of wires are wound in a plurality of blocks, reversed in vertical position between adjacent blocks, and cross each other in a region between adjacent blocks. This can further enhance the symmetry between the pair of wires and can reduce a parasitic capacitance component. In addition, since the first block belonging to the first layer winding portion is disposed closest to the first flange part, and the second block belonging to the second layer winding portion is disposed closest to the second flange part, the symmetry between the pair of wires can further be enhanced.

In the present invention, to further enhance the symmetry between the pair of wires, the difference in the number of turns between the first and second blocks is preferably one or less and, more preferably, the number of turns in the first block and the number of turns in the second blocks are the same.

In the present invention, the first layer winding portion may further include a third block adjacent to the second block, the second layer winding portion may further include a fourth block adjacent to the first block, and the difference in the number of turns between the third and fourth blocks may be equal to or less than one. This can reduce the parasitic capacitance component. To further enhance the symmetry between the pair of wires, the number of turns in the third block and the number of turns in the fourth block are preferably the same and, more preferably, the numbers of turns in the first through fourth blocks are the same.

Thus, according to the present invention, the symmetry between the pair of wires can be further enhanced in a common mode filter in which the pair of wires cross each other along the way.

BRIEF DESCRIPTION OF THE DRAWINGS

The above features and advantages of the present invention will be more apparent from the following description of certain preferred embodiments taken in conjunction with the accompanying drawings, in which.

BRIEF DESCRIPTION OF THE DRAWINGS

Hereinafter, a preferred embodiment of the present invention will be described in detail with reference to the accompanying drawings.

Figure 1:
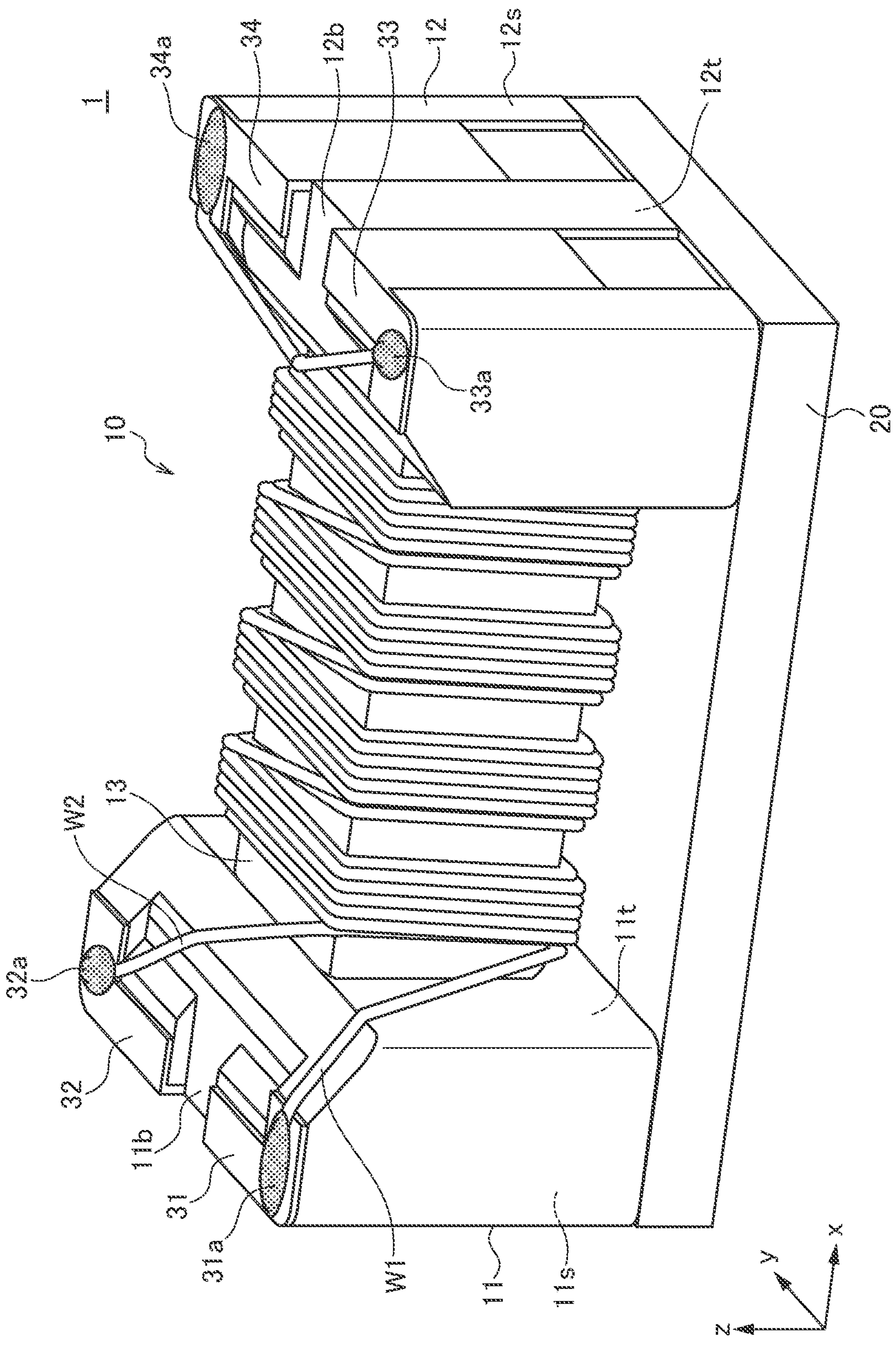
FIG. 1 is a schematic perspective view illustrating the outer appearance of a common mode filter 1 according to a first embodiment of the present invention.

FIG. 1 is a schematic perspective view illustrating the outer appearance of a common mode filter 1 according to a first embodiment of the present invention.

As illustrated in FIG. 1, the common mode filter 1 according to the first embodiment includes a drum core 10, a plate core 20, first to fourth terminal electrodes 31 to 34, and first and second wires W1 and W2. The drum core 10 and plate core 20 are each made of a magnetic material such as an Ni—Zn based ferrite. The first to fourth terminal electrodes 31 to 34 are each a metal fitting made of a good conductor material such as copper. The first to fourth terminal electrodes 31 to 34 may be obtained by directly baking silver paste or the like onto the drum core 10.

The drum core 10 has a first flange part 11, a second flange part 12, and a winding core part 13 disposed between the first and second flange parts 11 and 12. The winding core part 13 has its axis direction in the x-direction. The first and second flange parts 11 and 12 are disposed at axial both ends of the winding core part 13 and integrally formed with the winding core part 13. The plate core 20 is bonded to upper surfaces 11*t* and 12*t* of the respective flange parts 11 and 12. The upper surfaces 11*t* and 12*t* of the respective flange parts 11 and 12 constitute the xy plane, and their opposite surfaces are used as mounting surfaces 11*b* and 12*b*. The first and second terminal electrodes 31 and 32 are each provided on the mounting surface 11*b* of the first flange part 11 and an outer surface 11*s* thereof, and the third and fourth terminal electrodes 33 and 34 are each provided on the mounting surface 12*b* of the second flange part 12 and an outer surface 12*s* thereof. The outer surfaces 11*s* and 12*s* each constitute the yz plane. Fixation of the first to fourth terminals 31 to 34 is made by using an adhesive or the like.

The first and second wires W1 and W2 are wound around the winding core part 13 in the same direction. One and the other ends of the first wire W1 are connected respectively to connection portions 31*a* and 33*a* of the first and third terminal electrodes 31 and 33, and one and the other ends of the second wire W2 are connected respectively to connection portions 32*a* and 34*a* of the second and fourth terminal electrodes 32 and 34. The number of turns of the first wire W1 and the number of turns of the second wires W2 are the same. The connection portions 31*a* and 32*a* of the first and second terminal electrodes 31 and 32 are positioned on the mounting surface 11*b*, and connection portions 33*a* and 34*a* of the third and fourth terminal electrodes 33 and 34 are positioned on the mounting surface 12*b*.

Figure 2:
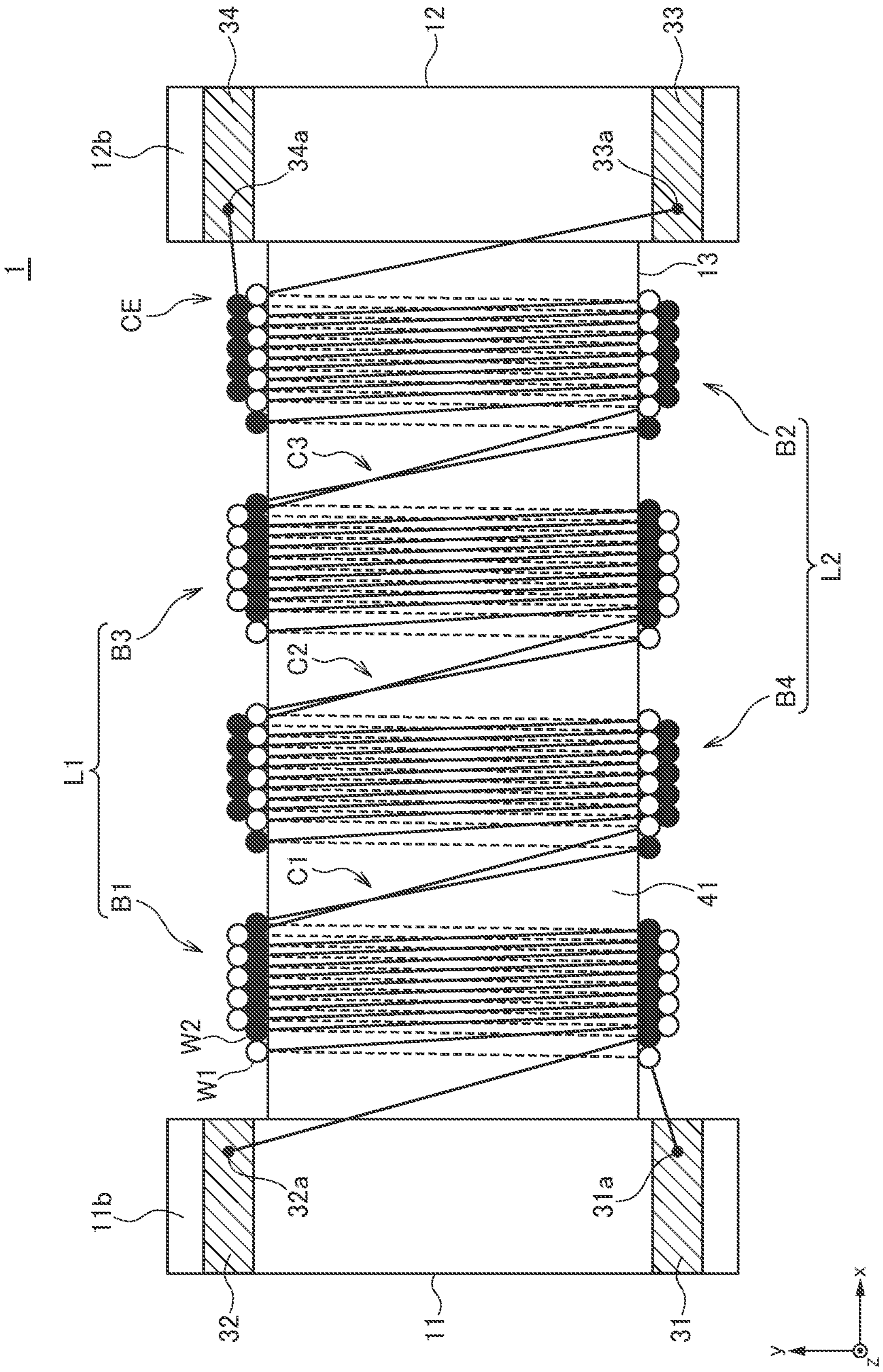
FIG. 2 is a schematic plan view for explaining the winding layout of the first and second wires W1 and W2 in a common mode filter 1.
Figure 3:
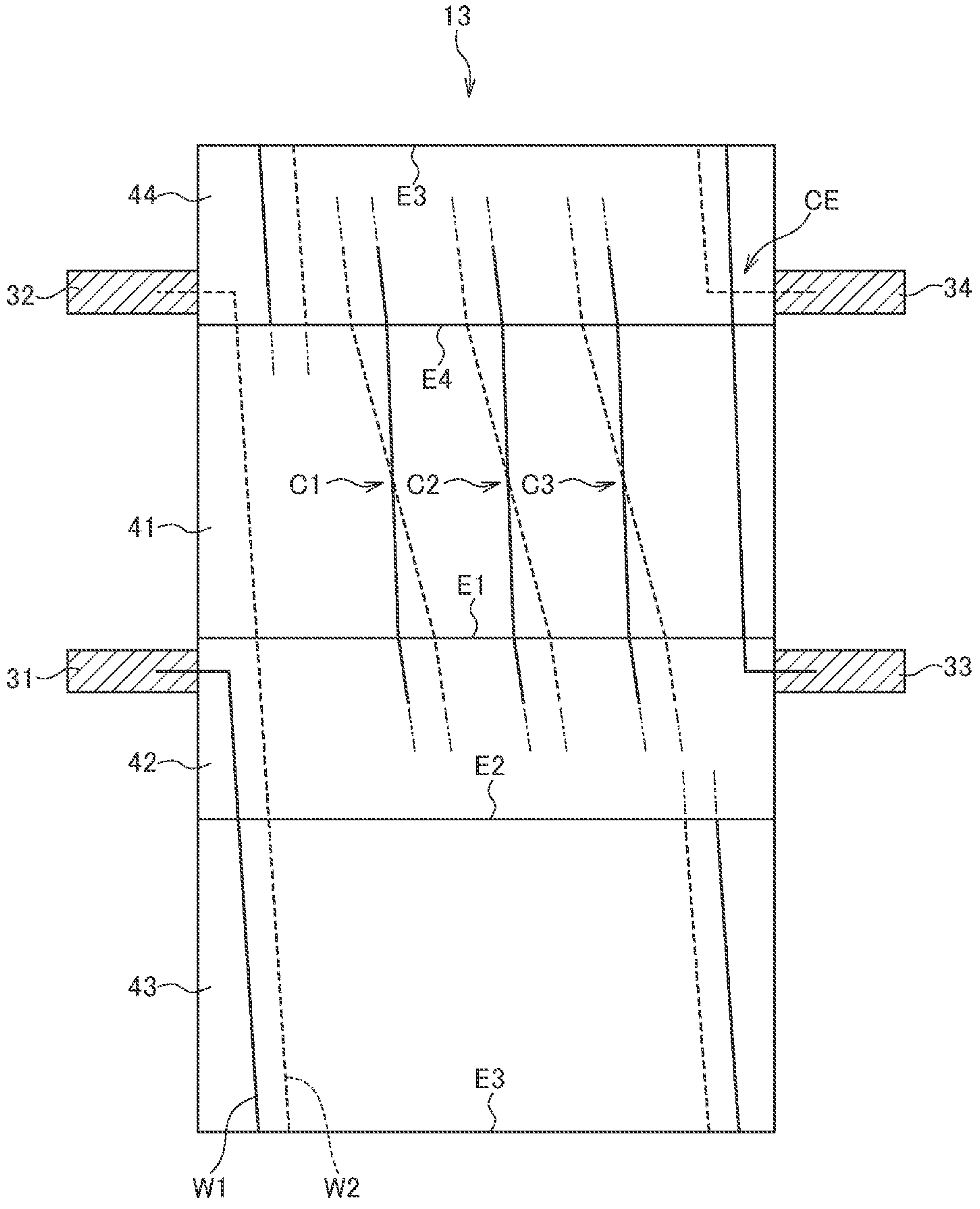
FIG. 3 is a schematic developed view for explaining the winding layout of the first and second wires W1 and W2 in a common mode filter 1.

FIG. 2 is a schematic plan view for explaining the winding layout of the first and second wires W1 and W2. FIG. 3 is a schematic developed view for explaining the winding layout of the first and second wires W1 and W2.

In the present embodiment, the winding core part 13 has a substantially rectangular shape in yz cross section and has four winding surfaces 41 to 44 as illustrated in FIG. 3. The winding surfaces 41 and 43 constitute the xy plane, and the winding surfaces 42 and 44 constitute the xz plane. The boundary between the winding surfaces 41 and 42 is defined by an edge E1, the boundary between the winding surfaces 42 and 43 is defined by an edge E2, boundary between the winding surfaces 43 and 44 is defined by an edge E3, and the boundary between the winding surfaces 44 and 41 is defined by an edge E4.

As illustrated in FIG. 2, the first and second wires W1 and W2 include a first layer winding portion L1 and a second layer winding portion L2. The first layer winding portion L1 includes two blocks B1 and B3 in each of which the first and second wires W1 and W2 are wound by layer winding in an aligned state with the second wire W2 positioned in the lower layer and the first wire W1 positioned in the upper layer. The second layer winding portion L2 includes two blocks B2 and B4 in each of which the first and second wires W1 and W2 are wound by layer winding in an aligned state with the first wire W1 positioned in the lower layer and the second wire W2 positioned in the upper layer. Thus, the first and second wires W1 and W2 are wound by layer winding as a whole, so that even when the numbers of turns of the respective first and second wires W1 and W2 are large, the length of the winding core part 13 in the x-direction can be reduced. In addition, the blocks B1 and B3 constituting the first layer winding portion L1 and the blocks B2 and B4 constituting the second layer winding portion L2 are axially alternately arranged, making it possible to make the lengths of the first and second wires W1 and W2 substantially coincide with each other.

The blocks B1 to B4 are arranged in the order of the blocks B1, B4, B3, and B2 from the first flange part 11 toward the second flange part 12. That is, the block B1 is disposed closest to the first flange part 11, and the block B2 are disposed closest to the second flange part 12. The first and second wires W1 and W2 have a first crossing portion C1 at which they cross each other between the blocks B1 and B4, a second crossing portion C2 at which they cross each other between the blocks B4 and B3, and a third crossing portion C3 at which they cross each other between the blocks B3 and B2. The positional relationship between the first and second wires W1 and W2 is reversed before and after the crossing of the wires, further enhancing the symmetry between the first and second wires W1 and W2.

In the example of FIG. 2, the blocks B1 to B4 each have a six-turn configuration and have 24 turns in total. Thus, the blocks B1 and B2 disposed at symmetrical positions have substantially the same characteristics, and the blocks B3 and B4 disposed at symmetrical positions have substantially the same characteristics. In particular, the vertical positions of the first and second wires W1 and W2 are reversed between the block B1 positioned at one axial end and the block B2 positioned at the other axial end, thus further enhancing the symmetry between the first and second wires W1 and W2.

To achieve the layer winding of the first and second wires W1 and W2 in an aligned state, the wire in the upper layer needs to be wound along the valley line formed by adjacent turns of the wire in the lower layer, so that the number of turns of the wire in the upper layer is smaller by one than the number of turns of the wire in the lower layer. Thus, in the block B1, the first turn of the first wire W1 counted from the connection portion 31*a* is exceptionally positioned in the lower layer; in the block B2, the seventh turn of the second wire W2 counted from the connection portion 32*a* is exceptionally positioned in the lower layer; in the block B3, the 13th turn of the first wire W1 counted from the connection portion 31*a* is exceptionally positioned in the lower layer; and in the block B4, the 19th turn of the second wire W2 counted from the connection portion 32*a* is exceptionally positioned in the lower layer.

As illustrated in FIG. 3, the first through third crossing portions C1 to C3 are all positioned on the winding surface 41. If the first and second wires w1 and W2 are made to cross each other an odd number of times, the positional relationship between the first and second wires W1 and W2 at one end side and the positional relationship therebetween at the other end side are reversed. However, in the common mode filter 1 according to the present embodiment, the first turns of the first and second wires W1 and W2 counted from the other ends are made to cross each other at a crossing portion CE on the winding surface 44, so that the positional relationship between the first and second wires W1 and W2 at one end side and the positional relationship therebetween at the other end side coincide with each other.

Thus, in the common mode filter 1 according to the present embodiment, the first and second wires W1 and W2 constitute the four blocks B1 to B4. Further, the first and second wires cross each other in a region between adjacent blocks and are reversed in vertical position between adjacent blocks. This can reduce a parasitic capacitance component and can further enhance the symmetry between the first and second wires W1 and W2. In particular, the vertical positions of the first and second wires W1 and W2 are reversed between the block B1 positioned at one axial end and the block B2 positioned at the other axial end, thus further enhancing the symmetry between the first and second wires W1 and W2.

Figure 4:
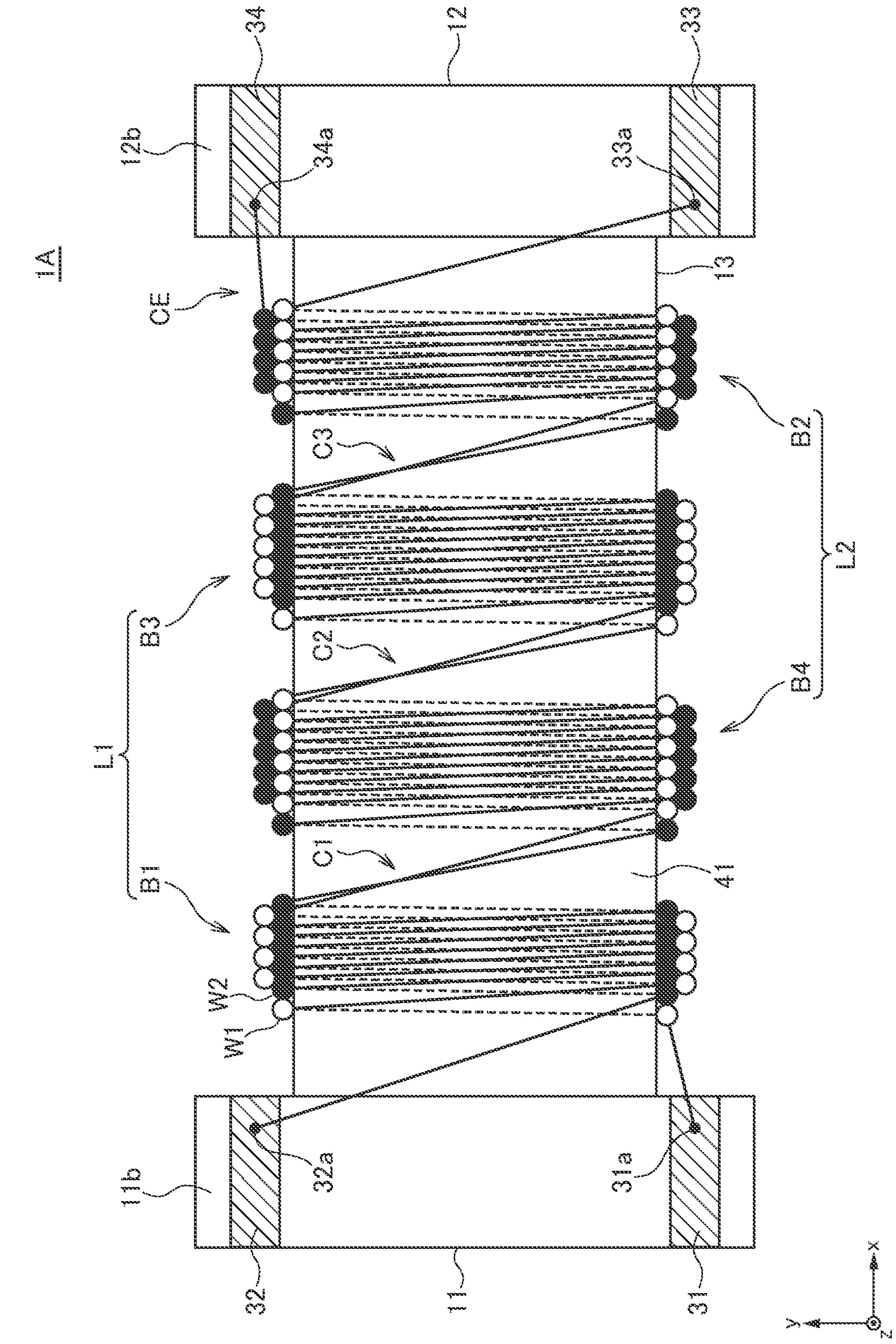
FIG. 4 is a schematic plan view for explaining the winding layout of the first and second wires W1 and W2 in a common mode filter 1A according to a first modification.

FIG. 4 is a schematic plan view for explaining the winding layout of the first and second wires W1 and W2 in a common mode filter 1A according to a first modification.

As illustrated in FIG. 4, the common mode filter 1A according to the first modification differs from the common mode filter 1 according to the first embodiment in that the blocks B1 and B2 each have a five-turn configuration, and the blocks B1 to B4 have 22 turns in total. Other basic configurations are the same as those of the common mode filter 1 according to the first embodiment, so the same reference numerals are given to the same elements, and overlapping description will be omitted. As exemplified by the common mode filter 1A according to the first modification, even when the total number of turns (=22) is not divisible by the number of blocks (=4), it is possible to maintain the symmetry between the first and second wires W1 and W2 by making the numbers of turns in the blocks B1 and B2 disposed at symmetrical positions coincide with each other and making the numbers of turns in the blocks B3 and B4 disposed at symmetrical positions coincide with each other.

Figure 5:
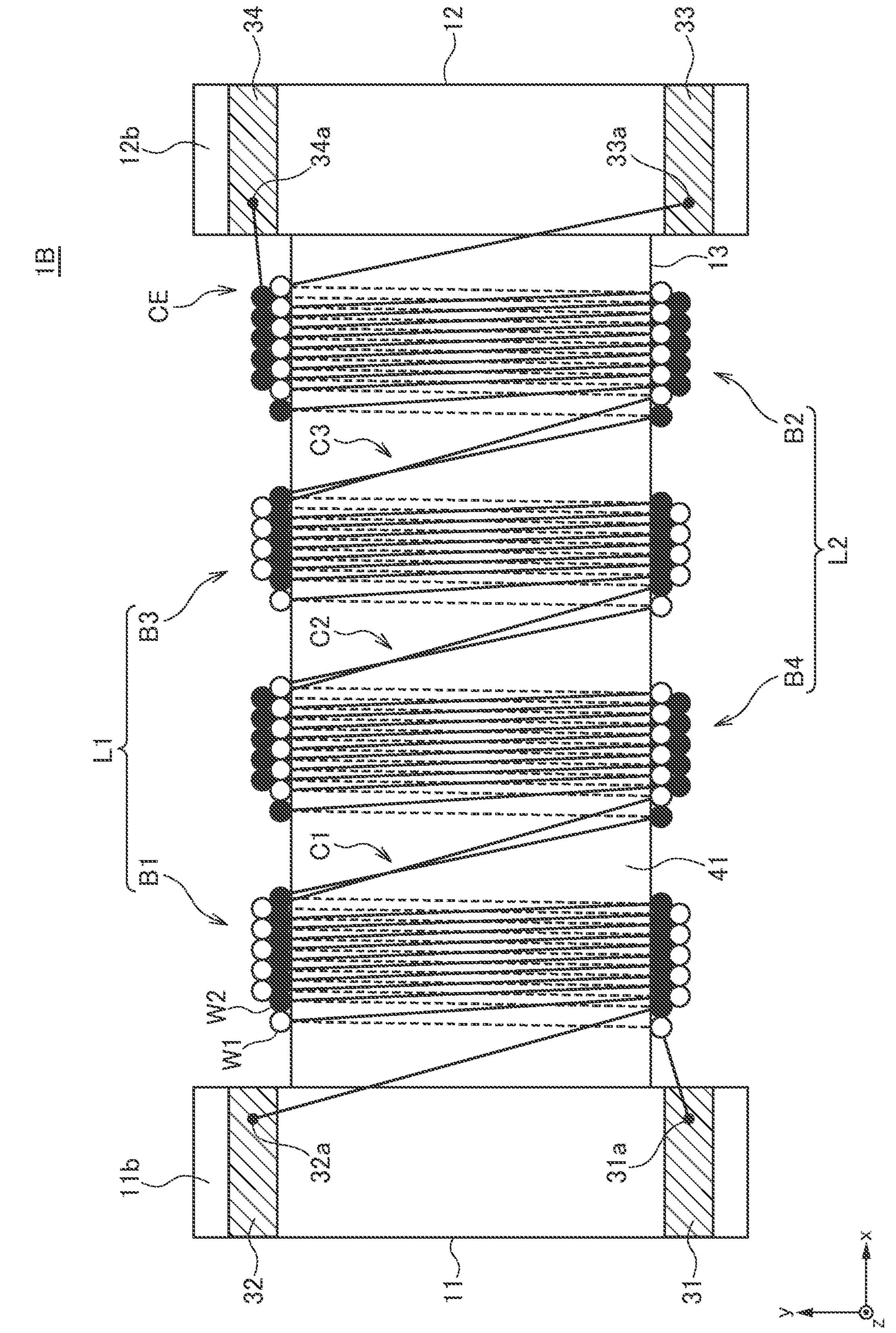
FIG. 5 is a schematic plan view for explaining the winding layout of the first and second wires W1 and W2 in a common mode filter 1B according to a second modification.

FIG. 5 is a schematic plan view for explaining the winding layout of the first and second wires W1 and W2 in a common mode filter 1B according to a second modification.

As illustrated in FIG. 5, the common mode filter 1B according to the second modification differs from the common mode filter 1 according to the first embodiment in that the block B3 has a five-turn configuration, and the blocks B1 to B4 have 23 turns in total. Other basic configurations are the same as those of the common mode filter 1 according to the first embodiment, so the same reference numerals are given to the same elements, and overlapping description will be omitted. As exemplified by the common mode filter 1B according to the second modification, even when the total number of turns (=23) is not divisible by the number of blocks (=4) and odd, it is possible to maintain the symmetry between the first and second wires W1 and W2 to some degree by making the numbers of turns in the blocks B1 and B2 disposed at end portions coincide with each other and making the difference in the number of turns between the blocks B3 and B4 be one.

Figure 6:
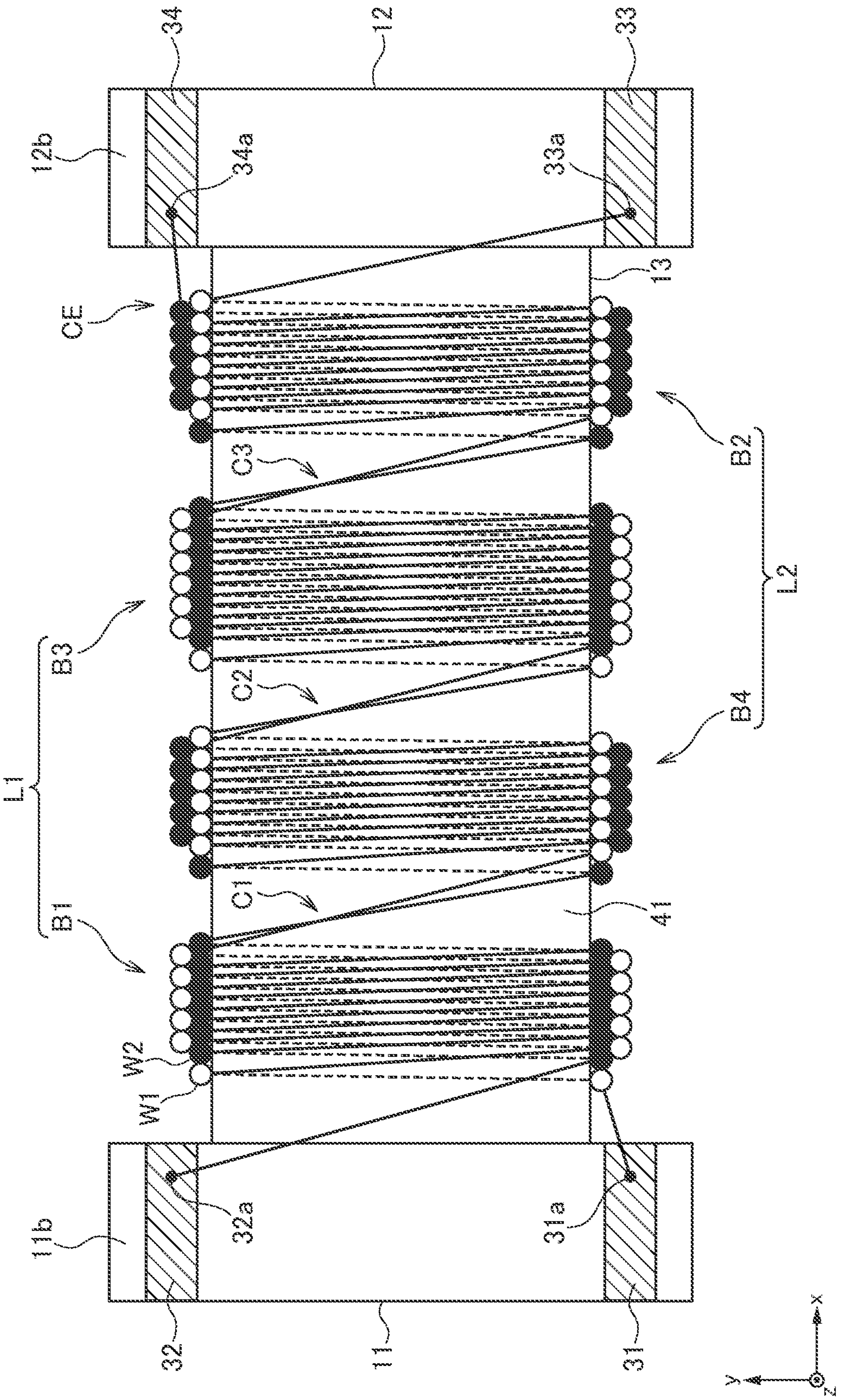
FIG. 6 is a schematic plan view for explaining the winding layout of the first and second wires W1 and W2 in a common mode filter 1C according to a third modification.

FIG. 6 is a schematic plan view for explaining the winding layout of the first and second wires W1 and W2 in a common mode filter 1C according to a third modification.

As illustrated in FIG. 6, the common mode filter 1C according to the third modification differs from the common mode filter 1 according to the first embodiment in that the block B3 has a seven-turn configuration, and the blocks B1 to B4 have 25 turns in total. Other basic configurations are the same as those of the common mode filter 1 according to the first embodiment, so the same reference numerals are given to the same elements, and overlapping description will be omitted. As exemplified by the common mode filter 1C according to the third modification, even when the total number of turns (=25) is not divisible by the number of blocks (=4) and odd, it is possible to maintain the symmetry between the first and second wires W1 and W2 to some degree by making the numbers of turns in the blocks B1 and B2 disposed at end portions coincide with each other and making the difference in the number of turns between the blocks B3 and B4 be one.

Although the number of turns in the block B1 and the number of turns in the block B2 coincide with each other in the first through third modifications, this is not essential in the present invention, and there may be a difference between them. Even in this case, it is preferable to make the difference in the number of turns between the blocks B1 and B2 be one to maintain high symmetry.

Figure 7:
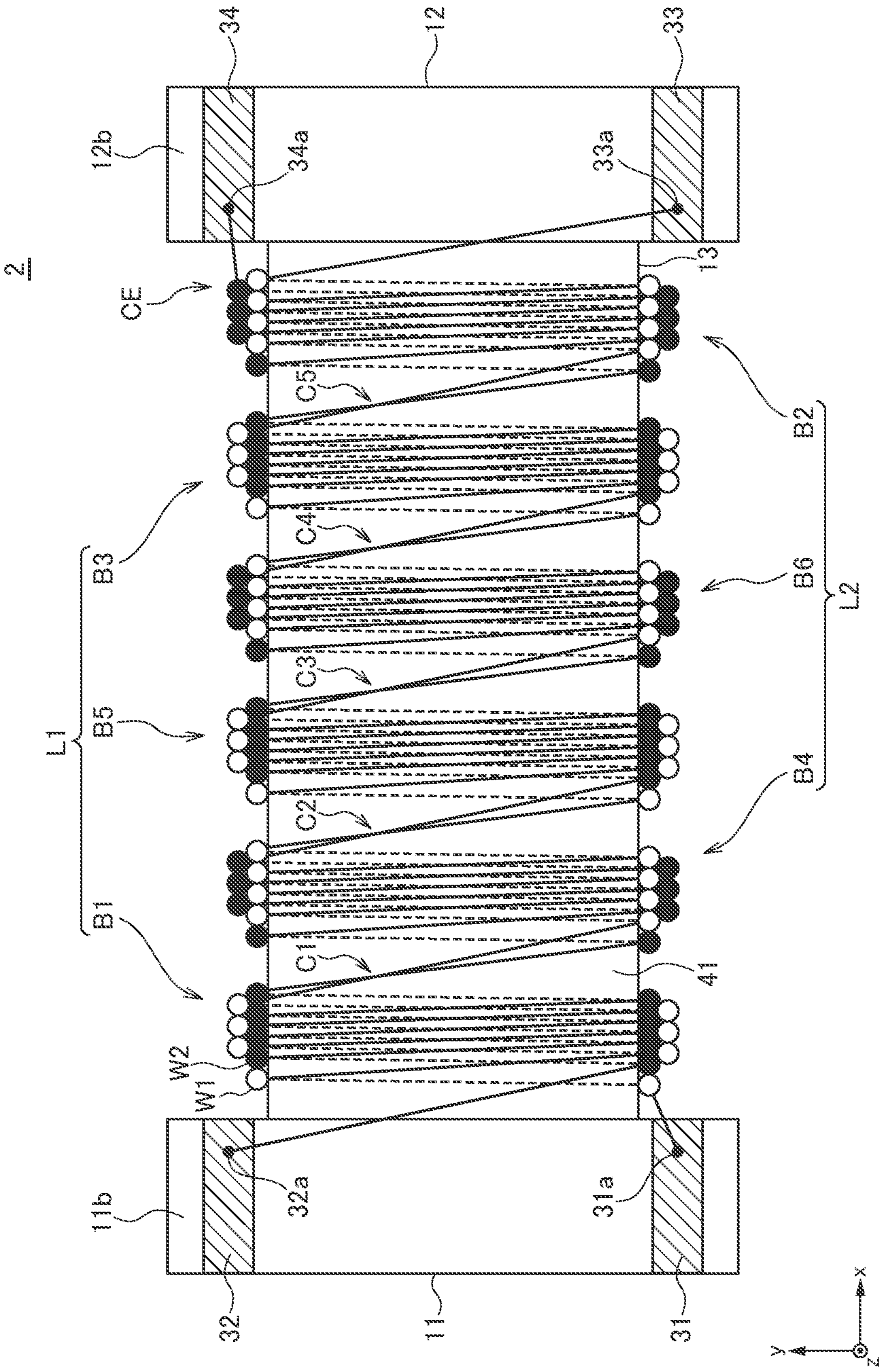
FIG. 7 is a schematic plan view for explaining the winding layout of the first and second wires W1 and W2 in a common mode filter 2 according to a second embodiment of the present invention.

FIG. 7 is a schematic plan view for explaining the winding layout of the first and second wires W1 and W2 in a common mode filter 2 according to a second embodiment.

As illustrated in FIG. 7, the common mode filter 2 according to the second embodiment differs from the common mode filter 1 according to the first embodiment in that the first and second wires W1 and W2 constitute six blocks B1 to B6. Other basic configurations are the same as those of the common mode filter 1 according to the first embodiment, so the same reference numerals are given to the same elements, and overlapping description will be omitted.

In the present embodiment, the first layer winding portion L1 includes blocks B1, B3, and B5, and the second layer winding portion L2 includes blocks B2, B4, and B6. The blocks B1 to B6 are arranged in the order of the blocks B1, B4, B5, B6, B3, and B2 from the first flange part 11 toward the second flange part 12. The first and second wires W1 and W2 have a first crossing portion C1 at which they cross each other between the blocks B1 and B4, a second crossing portion C2 at which they cross each other between the blocks B4 and B5, a third crossing portion C3 at which they cross each other between the blocks B5 and B6, a fourth crossing portion C4 at which they cross each other between the blocks B6 and B3, and a fifth crossing portion C5 at which they cross each other between the blocks B3 and B2.

As exemplified by the common mode filter 2 according to the present embodiment, the number of blocks constituted by the first and second wires W1 and W2 may be six. An increase in the number of blocks leads to a reduction in a capacitance component, thus making it possible to further improve signal characteristics in high frequency regions. The number of the blocks constituted by the first and second wires W1 and W2 is not particularly limited as long as it is an even number equal to or larger than four.

It is apparent that the present invention is not limited to the above embodiments, but may be modified and changed without departing from the scope and spirit of the invention.

What is claimed is:

1. A common mode filter comprising:

a core having a winding core part, a first flange part provided at one axial end of the winding core part, and a second flange part provided at other axial end of the winding core part;

first and second wires wound in a same direction around the winding core part;

first and second terminal electrodes provided on the first flange part and connected respectively with one ends of the first and second wires; and third and fourth terminal electrodes provided on the second flange part and connected respectively with other ends of the first and second wires, wherein the first and second wires include:

a first layer winding portion including a plurality of blocks in each of which the first and second wires are wound by layer winding in an aligned state with one of the first and second wires positioned in a lower layer and other one thereof positioned in an upper layer; and a second layer winding portion including a plurality of blocks in each of which the first and second wires are wound by layer winding in an aligned state with the one of the first and second wires positioned in the upper layer and the other one thereof positioned in the lower layer, wherein the plurality of the blocks constituting the first layer winding portion and the plurality blocks consisting the second layer winding portion are axially alternately arranged, wherein a first block belonging to the first layer winding portion is disposed closest to the first flange part, wherein a second block belonging to the second layer winding portion is disposed closest to the second flange part, wherein the first and second wires cross each other in a region between axially adjacent blocks, wherein the first layer winding portion further includes a third block adjacent to the second block, wherein the second layer winding portion further includes a fourth block adjacent to the first block, and wherein a difference in a number of turns between the third and fourth blocks is one or less.

2. The common mode filter as claimed in claim 1, wherein a difference in a number of turns between the first and second blocks is one or less.

3. The common mode filter as claimed in claim 2, wherein a number of turns of the first block is a same as a number of turns of the second block.

4. The common mode filter as claimed in claim 1, wherein a number of turns of the third block is a same as a number of turns of the fourth block.

5. The common mode filter as claimed in claim 4, wherein the numbers of turns in the first to fourth blocks are a same.

6. A common mode filter comprising:

a core including a winding core part;

a first wire wound around the winding core part, the first wire having a first section including one end of the first wire, a second section including other end of the first wire, and third and fourth sections located between the first and second sections; and a second wire wound around the winding core part, the second wire having a fifth section including one end of the second wire, a sixth section including other end of the second wire, and seventh and eighth sections located between the fifth and sixth sections, wherein the first section of the first wire is wound on the fifth section of the second wire plurality of times without crossing the fifth section of the second wire such that the first section of the first wire and the fifth section of the second wire form a first layer block, wherein the sixth section of the second wire is wound on the second section of the first wire plurality of times without crossing the second section of the first wire such that the second section of the first wire and the sixth section of the second wire form a second layer block, wherein the fourth section of the first wire is wound on the eighth section of the second wire plurality of times without crossing the eighth section of the second wire such that the fourth section of the first wire and the eighth section of the second wire form a third layer block, wherein the seventh section of the second wire is wound on the third section of the first wire plurality of times without crossing the third section of the first wire such that the third section of the first wire and the seventh section of the second wire form a fourth layer block, wherein the first and second wires cross each other between the first and fourth layer blocks, wherein the first and second wires cross each other between the second and third layer blocks, and wherein the first and second wires cross each other between the third and fourth layer blocks.

7. The common mode filter as claimed in claim 6, wherein a number of turns of the first section of the first wire is a same as a number of turns of the second section of the first wire, and wherein a number of turns of the fifth section of the second wire is a same as a number of turns of the sixth section of the second wire.

8. The common mode filter as claimed in claim 7, wherein a number of turns of the third section of the first wire is a same as a number of turns of the fourth section of the first wire, and wherein a number of turns of the seventh section of the second wire is a same as a number of turns of the eighth section of the second wire.

9. The common mode filter as claimed in claim 8, wherein the number of turns of the first section of the first wire is a same as the number of turns of the third section of the first wire, and wherein the number of turns of the fifth section of the second wire is a same as the number of turns of the seventh section of the second wire.

10. The common mode filter as claimed in claim 6, wherein the first wire further has ninth and tenth sections located between the third and fourth sections, wherein the second wire further has eleventh and twelfth sections located between the seventh and eighth sections, wherein the ninth section of the first wire is wound on the eleventh section of the second wire without crossing the eleventh section of the second wire such that the ninth section of the first wire and the eleventh section of the second wire form a fifth layer block, wherein the twelfth section of the second wire is wound on the tenth section of the first wire without crossing the tenth section of the first wire such that the tenth section of the first wire and the twelfth section of the second wire form a sixth layer block, wherein the first and second wires cross each other between the fourth and fifth layer blocks, and wherein the first and second wires cross each other between the fifth and sixth layer blocks.

11. The common mode filter as claimed in claim 10, wherein the first, second, third, fourth, ninth, and tenth sections of the first wire are wound around the winding core part in a same number of turns as one another, and wherein the fifth, sixth, seventh, eighth, eleventh, and twelfth sections of the second wire are wound around the winding core part in a same number of turns as one another.

* * * * *